US008078615B2

(12) United States Patent
Smith et al.

(10) Patent No.: US 8,078,615 B2
(45) Date of Patent: Dec. 13, 2011

(54) METHOD AND SYSTEM FOR SINGLE-ACTION PERSONALIZED RECOMMENDATION AND DISPLAY OF INTERNET CONTENT

(75) Inventors: Geoff Smith, San Francisco, CA (US); Garrett Camp, San Francisco, CA (US); Eric Boyd, Meaford (CA); Justin LaFrance, Calgary (CA)

(73) Assignee: Stumbleupon, Inc., San Francisco, CA (US)

( * ) Notice: Subject to any disclaimer, the term of this patent is extended or adjusted under 35 U.S.C. 154(b) by 324 days.

(21) Appl. No.: 10/411,341

(22) Filed: Apr. 11, 2003

(65) Prior Publication Data

US 2003/0195884 A1 Oct. 16, 2003

Related U.S. Application Data

(60) Provisional application No. 60/371,706, filed on Apr. 12, 2002.

(51) Int. Cl.
*G06F 17/30* (2006.01)
(52) U.S. Cl. ............... 707/732; 715/810; 715/835
(58) Field of Classification Search .............. 707/200, 707/202, 203, 832; 700/200, 202, 203; 715/835, 715/810
See application file for complete search history.

(56) References Cited

U.S. PATENT DOCUMENTS

| | | | |
|---|---|---|---|
| 5,749,081 A * | 5/1998 | Whiteis | 707/102 |
| 5,918,014 A | 6/1999 | Robinson | |
| 6,064,980 A * | 5/2000 | Jacobi et al. | 705/26 |
| 6,100,890 A | 8/2000 | Bates et al. | |
| 6,138,128 A * | 10/2000 | Perkowitz et al. | 715/205 |
| 6,195,657 B1 * | 2/2001 | Rucker et al. | 707/5 |
| 6,266,667 B1 * | 7/2001 | Olsson | 707/10 |
| 6,415,368 B1 * | 7/2002 | Glance et al. | 711/158 |
| 6,484,123 B2 * | 11/2002 | Srivastava | 702/181 |
| 6,539,377 B1 * | 3/2003 | Culliss | 707/5 |
| 6,601,100 B2 * | 7/2003 | Lee et al. | 709/226 |
| 6,751,649 B1 * | 6/2004 | Mahiddini et al. | 709/203 |

(Continued)

FOREIGN PATENT DOCUMENTS

EP 1051683 A2 11/2000
(Continued)

OTHER PUBLICATIONS

Article entitled "New Google Toolbar lets users rate Pages", by Sullivan, dated Dec. 3, 2001.*

(Continued)

*Primary Examiner* — Mahesh Dwivedi
(74) *Attorney, Agent, or Firm* — Fenwick & West LLP

(57) ABSTRACT

A method and system for single-action personalized recommendation and display of content via the Internet. The recommendation is given by a server system and received by a client system. The content itself has been previously recommended to the server system by the users of the client system. Client system recommendations to the server system are also invoked with a single-action. Recommended content is referred to by a URL. Users can rate content to the server system using a single-action. The server system performs recommendation calculations using user-specific information such as user preferences, demographic data, content rating history, and content-specific information. The content rating history of other users may also influence these calculations. Client systems display recommended content directly to the user in response to only a single-action.

24 Claims, 18 Drawing Sheets

U.S. PATENT DOCUMENTS

| | | | |
|---|---|---|---|
| 6,766,362 B1* | 7/2004 | Miyasaka et al. | 709/219 |
| 7,031,961 B2* | 4/2006 | Pitkow et al. | 707/4 |
| 7,206,757 B2* | 4/2007 | Seigel et al. | 705/26 |
| 7,373,313 B1* | 5/2008 | Kahle et al. | 705/26 |
| 2001/0021914 A1* | 9/2001 | Jacobi et al. | 705/8 |
| 2001/0044810 A1 | 11/2001 | Timmons | |
| 2001/0047315 A1 | 11/2001 | Siegel | |
| 2002/0002571 A1* | 1/2002 | Manohar et al. | 707/526 |
| 2002/0016786 A1 | 2/2002 | Pitkow et al. | |
| 2002/0019763 A1* | 2/2002 | Linden et al. | 705/10 |
| 2002/0103789 A1* | 8/2002 | Turnbull et al. | 707/3 |
| 2002/0198882 A1* | 12/2002 | Linden et al. | 707/10 |

FOREIGN PATENT DOCUMENTS

| | | |
|---|---|---|
| EP | 1111517 A2 | 6/2001 |
| EP | 1126681 A2 | 8/2001 |
| WO | WO-9913424 A1 | 3/1999 |
| WO | WO-0042593 A1 | 7/2000 |
| WO | WO-0125947 A1 | 4/2001 |

OTHER PUBLICATIONS

Article entitled "About What's Related", retrieved from the Internet Wayback Machine, dated Feb. 7, 2001, by Netscape.*

Article entitled "Alexa Accessorizes Browsers", dated Sep. 22, 1997, by Lash.*

Article entitled "Alexa Meets Google" by Price, dated May 14, 2002.*

Article entitled "Frequently Asked Questions" by Alexa, dated Aug. 15, 2000.*

Article entitled "Alexa Internet and Netscape Team to Provide Related Sites to Support Smart Browsing" by Ransom, dated Jun. 1, 1998.*

Article entitled "Finding Related Pages in the World Wide Web" by Dean et al., dated Mar. 1, 1998.*

Article entitled "Exploring the Web with Reconnaissance Agents" by Lieberman et al., dated Aug. 2001.*

Article entitled "Netscape Communicator 4.5 Preview Release 2" by Lynch, dated Sep. 15, 1998.*

Article entitled "Alexa's Free Web Navigator Deftly Searches for Web Sites" by Millman, dated Apr. 27, 1998.*

Herlocker, Jonathan L., et al., "An Algorithmic Framewo for Performing Collaborative Filtering", *Proceedings of the 22nd annual international ACM SIGIR conference on Research and development in information retrieval*, (1999),230-237.

Lashkari, Y., et al., "Collaborative Interface Agents", *MIT Press* vol. 1, (1994),444-449.

Greening, Dan R., "Building Consumer Trust with Accurate Product Recommendations", *A White Paper on LikeMinds WebSell 2.1*, (1997), 15 pgs.

* cited by examiner

Figure 1a
101a
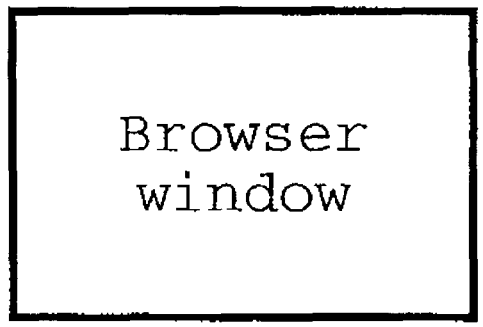
102a
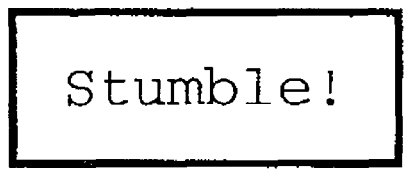
103a
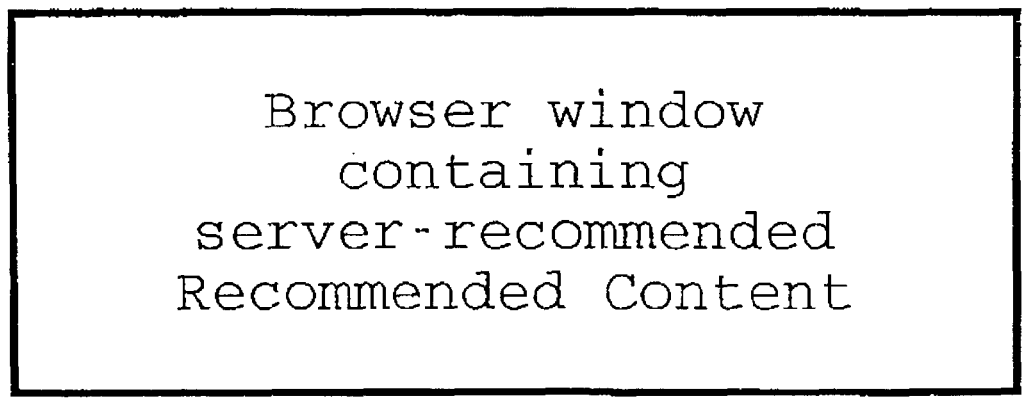

Browser window
containing
to-be-recommended
Internet content

102b

Great!

103b

Browser
window
indicating
success

METHOD AND SYSTEM FOR SINGLE-ACTION PERSONALIZED RECOMMENDATION AND DISPLAY OF INTERNET CONTENT

CROSS REFERENCE TO RELATED APPLICATION

This application is a regular application of U.S. Provisional Patent application Serial No. 60/371,706 filed on Apr. 12, 2002, the entirety of which is incorporated herein by reference.

FIELD OF THE INVENTION

The present invention relates to a computer method and system for recommending content over the Internet.

BACKGROUND OF THE INVENTION

The Internet comprises a vast number of computers and computer networks that are interconnected through communications links. Many different services and protocols operate over the Internet, including email, the world-wide-web (WWW), file transfer, and chat services.

The WWW service consists of server systems and client systems exchanging documents via the Hyper-Text Transport Protocol (HTTP). Server systems are generally permanently dedicated computers with high bandwidth connections to the Internet. They host the Internet content, run the server software, and perform many types of calculations. Client systems are generally personal computers being controlled by an individual. They display a Graphical User Interface (GUI) to the user, and run applications, such as browsers, which allow users to send requests for Internet content to the server systems, and then view the content.

Internet content is any publicly available content accessible via the Internet. Content accessible via the Internet may consist of Hyper-Text-Mark-up-Language (HTML) documents, images, portable document files (PDF), flash, video, audio, animation, etc. Typically, a client requests and displays these documents using a browser. All Internet content can be identified via a Uniform Resource Locater (URL), a string of text including a protocol name, machine name (expressed in text, but translated to IP address via a system called Domain Name System (DNS)), remote directory name, and file name. It is these URLs which allow the powerful "linking" behavior which is a prominent feature of browsers.

Many of the early innovations on the WWW consisted of means of finding high quality Internet content.

For instance, search engines are server side applications which accept keyword input from clients, and attempt to find Internet content to which those words are relevant. They generally do this by downloading large numbers of documents, and indexing them in a sophisticated database. When keyword queries are received, these databases are used to locate Internet content which contains the specified keywords, whereupon the URLs which refer to this Internet content are returned to the client. The user reviews any information provided about each URL to determine which selection(s) of Internet content, if any, are of interest. The user then indicates to the browser, typically by clicking a link, to retrieve the Internet content referenced by the selected URL. The browser then retrieves and displays this content. Thus search engines involve multiple steps for users: typing in keywords, submitting the query, reviewing summaries, and clicking on links to the actual Internet content. Some search engines have a feature which involves redirecting the browser directly to the first result of a keyword search. This reduces the number of steps that the user must perform. It is important to recognize, however, that this is not a single-action method. The effectiveness of this feature is often a matter of luck, as the relevance and quality of the search engine's first selection may not be significantly different from that of further selections.

Another Internet content service, typically known as a "portal," consists of dynamically generated web pages with content tailored for the user. For instance, via a simple questionnaire, a server may discover that the client is interested in a particular subject matter. Future visits from that client (which can be determined by any number of existing technologies) can be rewarded with pages containing links to Internet content about that subject matter. The user may review these links for an indication of content that may be of interest. The user then indicates to the browser, typically by clicking a link, to retrieve the Internet content referenced by the selected link. The browser then retrieves and displays this content. As in the case of search engines, this is a multiple-action method. It also requires that the user visit the portal site on a regular basis, to check for new links of interest.

There are also many services on the Internet designed to locate highly specific types of data, based upon user preferences. Match making services are an example. These services attempt to match people, based on shared interests, user-specified preferences, and so forth. Another common example is online stock portfolios. These services allow users to view financial market information assembled in a customized fashion. In general, such services present the user with relevant information specific to the domains to which they apply. These domains are often quite small and highly specialized. The content which they present typically is provided only by the service in question, or its affiliates and partners. Of particular importance is to note that recommendations made by such services are, in fact, recommendations for objects in that domain as opposed to recommendations of Internet content. For example, match making services recommend people. Investment services recommend investments. Online bookstores recommend books. In a sense, recommendations received from these services present users with more specific information in the domain of the service provider but do not present users with information that they would not have known to look for. In this respect, these services operate almost as a domain-specific search engine supporting complex queries. The personalization and recommendation technologies used by such services tend to be very specific to their respective domains. These technologies are not extensible to the full scope of Internet content.

Personal bookmark systems, embedded as a part of most major browsers, are essentially ways to remember URLs on the client side. Since finding quality Internet content can be difficult, it is convenient to remember URLs specifying the location of that content. Many people use their bookmarks in more public ways as well; making them publicly available via their own web pages, sending them to friends, or otherwise essentially using shared bookmarking behavior to locate good Internet content. This method requires extensive user action, but is often the source of recommendations superior to any automated system yet in existence.

The system and method detailed herein describe a new and innovative method of locating high quality Internet content, where an essential feature is single-action convenience. For a browser-based client, the indication of this single-action is always available regardless of the currently displayed content. Equally important, all of the content recommended by the server system has been recommended to the server system by its users. Users are preferably human beings, but may potentially be any automated system that interfaces with the server system in the same way as would an individual person. Potentially, this could include systems that find and/or rate content, such as web spiders.

SUMMARY OF THE INVENTION

The present invention involves single-action personalized recommendation of Recommended Content. Recommended Content is arbitrary Internet content recommended by any user of the system. Arbitrary Internet content is any publicly available content accessible via the Internet.

An embodiment of the present invention provides a method and system for requesting recommendations of Internet content via a client system. The client system implements a user interface, which contains an indication of an action (e.g., a single action such as clicking a mouse button) that a user is to perform to obtain content recommended by the server system. In response to the indicated action being performed, the client system sends to a server system the client identifier and a request to obtain an URL(s) which references content recommended by the server system. The server system uses the client identifier to locate additional information needed to generate a recommendation(s) for the user. The server system generates the recommendation(s), and then returns it (them) to the client. The client then interfaces with a browser, directing it to retrieve and display the content recommended by the server system, referenced by the obtained URL(s). Thus, the user of the client system has to perform only a single action to view content recommended by the server system.

The present invention also involves single-action submission of recommendations by the client system to the server system. The client system contains an indication of an action that a user is to perform to rate the quality or directly recommend Internet content currently displayed in the web browser. In a preferred embodiment, the single-action is clicking a mouse button. There may be multiple indications of actions to distinguish the quality rating. In a preferred embodiment, the indications are buttons labeled "good," "bad" and "great".

In response to the indicated action being performed, the client system sends to the server system the client identifier, the URL referencing the currently displayed content and the indicated rating. The server system records the client identifier, URL and rating. This new information is used to refine recommendations of content made to the user. It is also used to refine recommendations made to other users both by making available the newly Recommended Content to future recommendations and by establishing relationships with the current user. Each time a rating is submitted, potentially, recommendation calculations are made to determine content to recommend both to the current user and other users. These calculations refine previous calculations, potentially determining new content to recommend, determining that content determined by a prior calculation is no longer a good selection, or determining that the relative priority of selected recommendations should be adjusted. The selection of content determined to be the best recommendation by these calculations is recommended to the user the next time the user performs the indication of an action to view content recommended by the server. Thus, the user of the client system has to perform only a single action to rate content.

In a broad aspect of the invention, a method is provided for automatically obtaining a recommendation, and then displaying the Internet content associated with that recommendation. The method consists of, under control of the client system, a method enabling a user interface for controlling the recommendation system; in response to only a single action being performed, sending a request for recommendation(s) from the client system to a server system, along with an identifier of the user of the client system. Then, under control of the server system, receiving a request for a recommendation, dynamically choosing Recommended Content to recommend to the client, based on data associated with the client identifier, such as user preferences, demographic data, content rating history, and content-specific information such as subject matter, content quality, complexity of language, and general aesthetics as well as content rating and preferences of other users, determining the URL(s) which refer to the above content, and finally issuing a response from a server system containing those URL(s) and associated information. Then, under control the client system, receiving the URL(s) and associated information, interfacing with a web browser application, and directing it to retrieve and display the content recommended by the server system referred to by the URL(s).

In a preferred aspect of the invention, the method above wherein enabling a user interface includes displaying a graphical user interface with a method for invoking the single action. Also, the method above wherein enabling a user interface includes the use of a browser toolbar. Also, the method above wherein the single action is clicking a button. Also, the method above wherein a user of the client system does not need to explicitly identify themselves when requesting a recommendation. Also, the method above wherein the client system and server system communicate via the Internet. Also, the method above wherein the single action is clicking a mouse button when a cursor is positioned over a predefined area of the user interface. Also, the method above wherein the single action is a sound generated by a user, such as speech. Also, the method above wherein the single action is selection using a television remote control. Also, the method above wherein the single action is depressing of a key on a key pad. Also, the method above wherein the single action is selecting using a pointing device. Also, the method above wherein the single action is selection of a user interface component.

In a broad aspect of the invention, a client system is provided for obtaining a recommendation, and then displaying the content recommended by the server system associated with it. The client system consists of an identifier that identifies a user, a display component for displaying a user interface, a single-action user interface component that in response to performance of only a single action, sends a request to a server system to obtain a recommendation, the request including the identifier so that the server system can locate additional information needed to complete the request, and so that the server system can fulfill the request for a recommendation. The client system also includes a component which receives the recommendation from the server, in the form of URL(s), and a component which interfaces with web browser software, and instructs that software to retrieve the content identified by an URL, and display it to the user.

In a preferred aspect of the client system, the display component is a browser. Also, the client system above wherein the display component is a browser toolbar. Also, the client system above wherein the display component is a browser plug-in. Also, the client system above wherein the display component is a browser component. Also, the client system above wherein the single action is the clicking of a mouse button.

In a broad aspect of the invention a server system is provided for generating recommendations of Recommended Content. The server system consists of a client identifier storage component, a content rating storage component, a user preference storage component, a demographic data storage component, a Recommended Content data storage component, a single-action recommending component. The single-action recommendation component itself consists of a receiving component for receiving requests to obtain a recommendations, the request including the client identifier, the request being sent in response to only a single action being performed; and a personalized recommendation component that uses data from storage components specific to the client and specific to Recommended Content, and perform calculations in order to choose Recommended Content to recommend. The server system also contains a component which determines the URL(s) which refer to the above Recommended Content, and a sending component, which sends to the client system, the URL(s) determined above, along with associated information.

In a preferred aspect of the server system, the request is sent by a client system in response to a single action being performed.

In a broad aspect of the invention, a client system is provided for the submission of recommendations of Internet content. The client system consists of a client identifier that identifies a user, a display component for displaying a user interface, a single-action user interface component that in response to performance of only a single action, sends a message to a server system containing details of the recommendation, including URL, and potentially the quantitative value (e.g. rating) of the recommendation, and a component which receives confirmation from the server, and displays this confirmation to the user.

In a preferred aspect of the client system the single-action to be performed is the pushing of a button. Also, the client system above wherein the 'recommend' button is part of a rating interface. In this case, the client may have many buttons each triggered by a single-action.

In a broad aspect of the invention, a server system is provided for the receiving of ratings and recommendations of Internet content. This server system consists of a Recommended Content data storage component, a recommendation storing component, a receiving component for receiving recommendations from clients, the request including the client identifier, the request being sent in response to only a single action being performed; a Recommend Content storage component, which stores the recommendation from the client, along with any associated data sent by the client; a sending component, which sends to the client system a confirmation of submission.

In a preferred aspect of the above server system the single-action is the push of a button. Also, the system above wherein in addition to the Recommended Content data storage component there is a rating storage component responsible for storing ratings of Internet content. The ratings are those sent with the above client system In a broad aspect of the invention, a method is provided for receiving recommendations from client systems. This method consists of, under control of the client system, a method enabling a user interface for controlling the recommendation system; in response to only a single action being performed, sending a recommendation from the client system to a server system, in the form of a URL referring to the Internet content, along with an identifier of the user of the client system. Under control of the server system, receiving a recommendation, storing the recommendation in the Recommended Content data database, issuing a response from a server system containing a confirmation. Under control the client system, receiving the confirmation, optionally, interfacing with a web browser application, and directing it to display success to the user.

BRIEF DESCRIPTION OF THE DRAWINGS

FIG. 1a is a block diagram illustrating single-action server-recommendation in one embodiment of the present invention;

FIG. 1b is a block diagram illustrating single-action user-recommendation in one embodiment of the present invention;

FIG. 13 is a partial screen shot illustrating a more comprehensive form for selecting categories of the user's interests;

FIG. 14 is a partial screen shot illustrating acknowledgment of the recordal of the user's preferred categories of the user's interests;

DETAILED DESCRIPTION OF THE INVENTION

Having reference to FIGS. 1-19f, the present invention provides a method and system for single-action personalized recommendation of Internet content in a client/server environment, as well as the immediate display of this content to the user. The single-action recommendation system of the present invention minimizes the number of user interactions needed to obtain and view content recommended by the server system.

Figure 9:
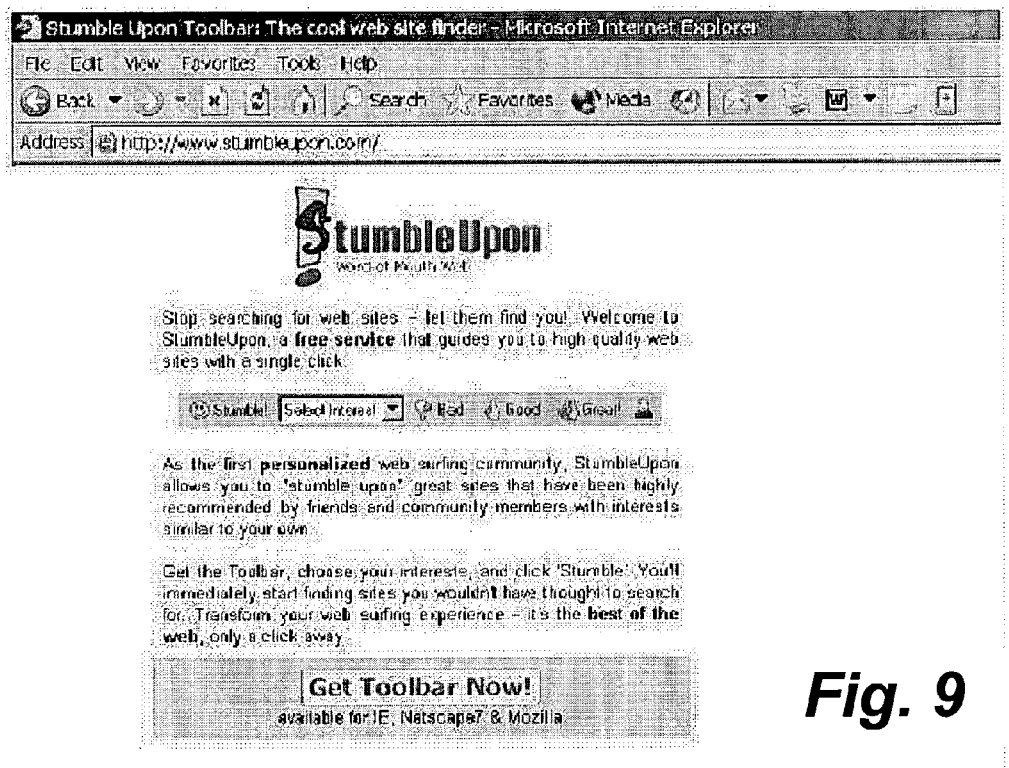
FIG. 9 is a view of a web screen shot introducing one embodiment of the invention according to the Example, and in which a new user is invited to install a custom interface for personalized web surfing to the standard tool bar as illustrated.
Figure 10:
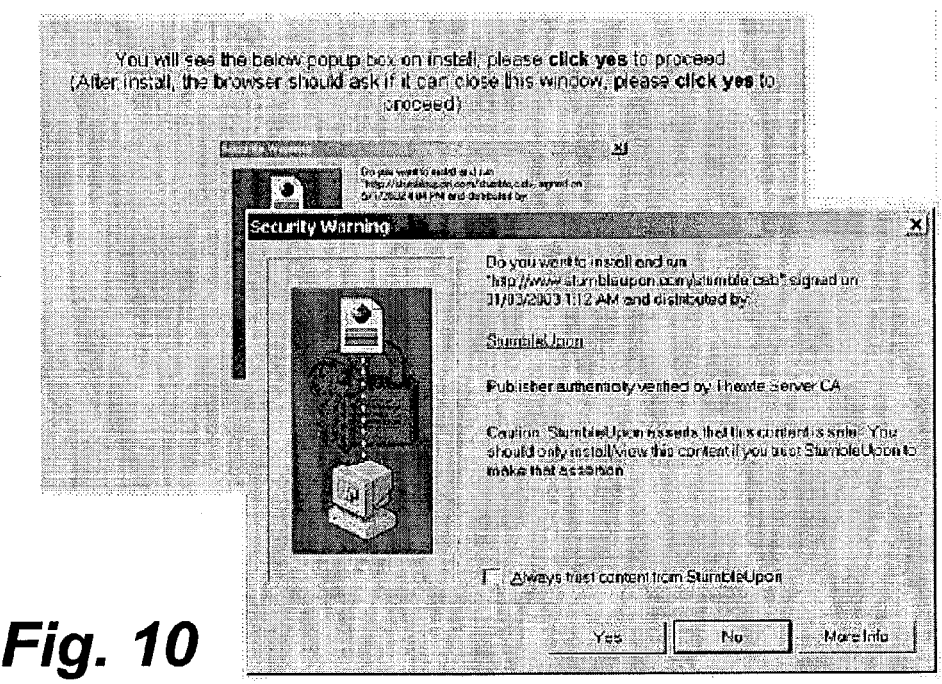
FIG. 10 is partial web screen shot of an example of a standard web security warning prior to modification of the user's web browser.
Figure 11:
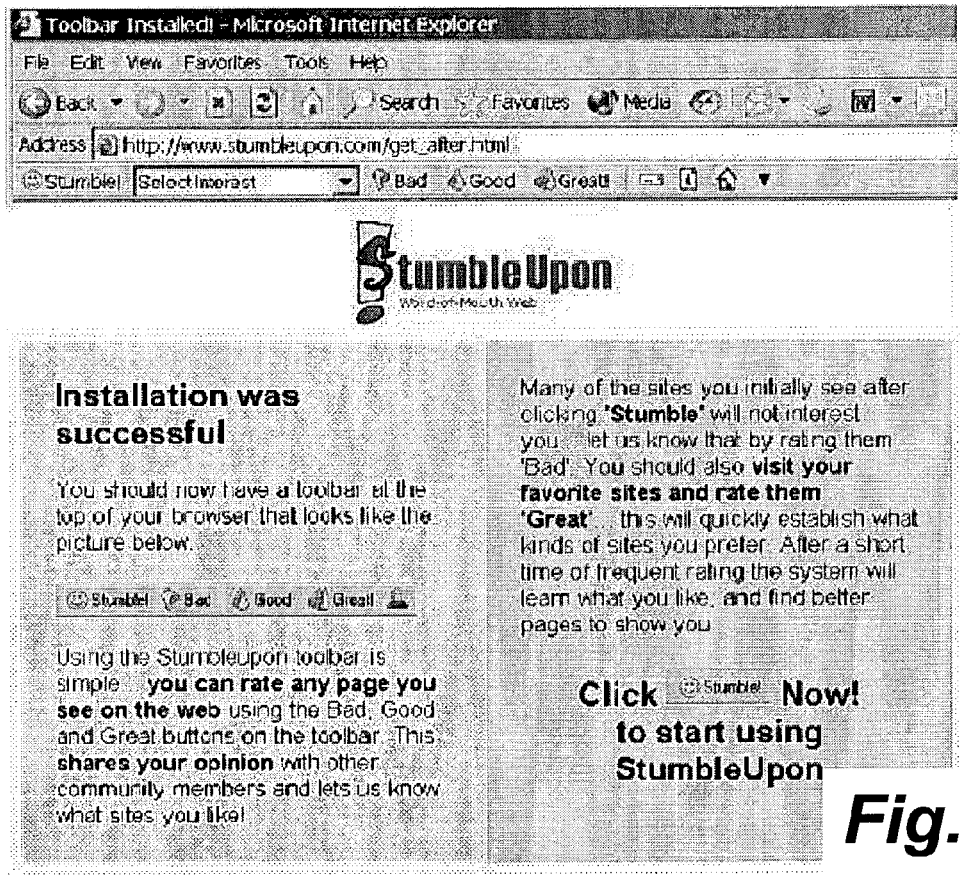
FIG. 11 is a view of a web screen shot illustrating the successful additional of a custom toolbar added to the standard tool bar, now providing single-click action buttons for implementing the invention including: personalized search action initiator, rating (bad, good, great) and administration access.
Figure 12:
FIG. 12 is a partial screen shot illustrating a preliminary form for selecting categories of the user's interests.
Figures 13, 14:
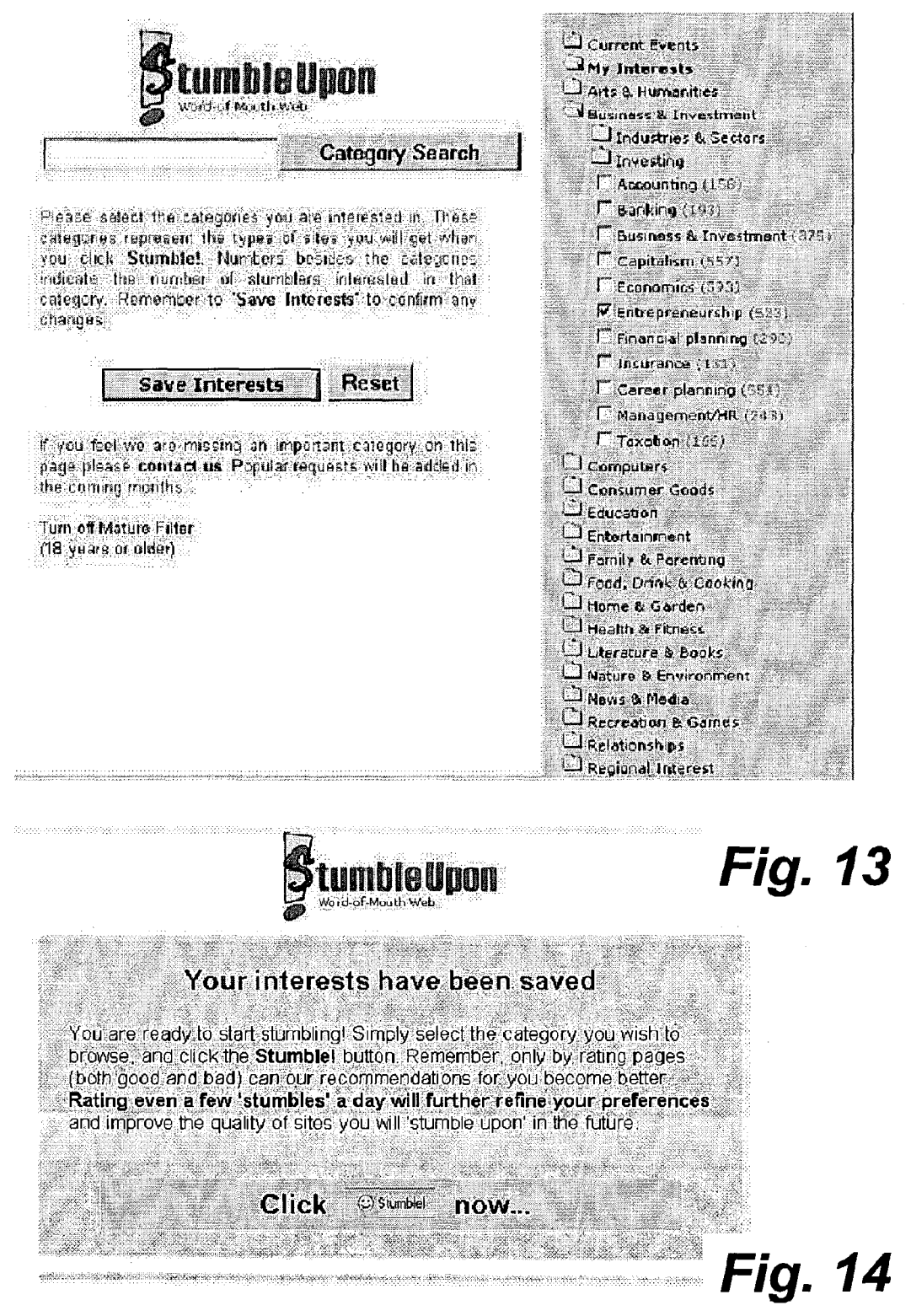
Figure 17:
FIG. 17 illustrates a partial web shot of the implementation of one administration button on the custom toolbar enabling various housekeeping functions for the user's account including altering category preferences.

In order to enable the system, the client must register for the recommendation service. In one embodiment of the present invention, as shown in FIGS. 9-11, a client system is installed by a user simply by directing a web browser to a specified hyperlink. On initial use, the client is provided with a unique identifier, such as a cookie. Additionally as shown in FIGS. 8 and 12-14, the client system directs the web browser to a form where users are asked to select from a broad range of interests and, optionally, to supply demographic data. Upon completion of this form, the registration process is complete. After the sign up process, the single-action recommendation process can be affected at any time. Further, as shown in FIG. 17, categories of interest preferences and other functions related to the user's account may be altered at any time by the user, through the toolbar.

Figure 15:
FIG. 15 illustrates the user's option to select a category of interest to which the system will select and apply personalized recommendations of web content wherein, selection of the search initiation button "Stumble" will retrieve the recommended content.

As shown in FIG. 15, when a user wants to view recommended content, the user uses a client system to submit the request for recommendations along with a client identifier to the server system. The user need only perform a single action (e.g., click a mouse button) to obtain the recommendation, and view the content recommended by the server system. When the user performs that single action, the client system sends a request for recommendation to the server system. This request may be sent directly from client to server or via the browser. The server system then uses real-time Web personalization software, such as Macromedia Llkeminds, to generate personalized recommendations. In general, these systems incorporate into their recommendation calculations user-specific information such as user preferences, demographic data, content rating history, and content-specific information such as subject matter, content quality, complexity of language, and general aesthetics. See FIG. 5, and further description, below. The database of content from which recommendations are chosen is itself built from content recommended to the system by users (see below for detailed description). Once the content to recommend has been chosen, the server system determines the URL(s) which refer to that Recommended Content. If the original request was submitted directly by the client, this URL(s) is then sent back to the client, along with associated information. The client system then interfaces with a browser application, instructing it to retrieve and display the content recommended by the server system, referenced by the URL. Otherwise, the server instructs the browser to retrieve and display the content recommended by the server system, referenced by the URL. Thus, after completion of the registration process, the user has only to perform a single action in order to view content recommended by the server system.

Herein, recommended content is associated with indexing information, the form of which may be dictated by the personalization software or supporting applications. Such indexing information may include the URL, key words, an identifier of a network user who has expressed an interest in the content and other identifiers. The system manages recommendations which are associated with the indexing information for the content and which may further include user ratings about the content. Recommendations are thereby associated with the recommended content. The system would not typically manage content as that is the territory of the content provider.

Figure 16:
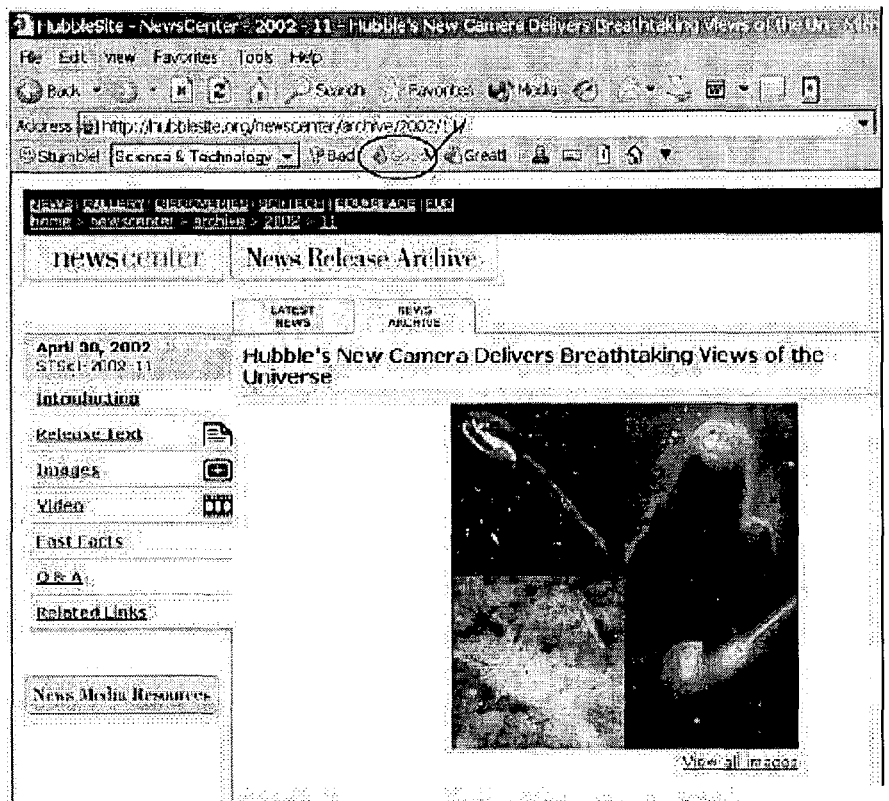
FIG. 16 illustrates a web screen shot of an initial result of the personalized search in the user's preferred category of "Science and Technology". Further the user has selected the "good" button for rating the recommended content.
Figure 18:
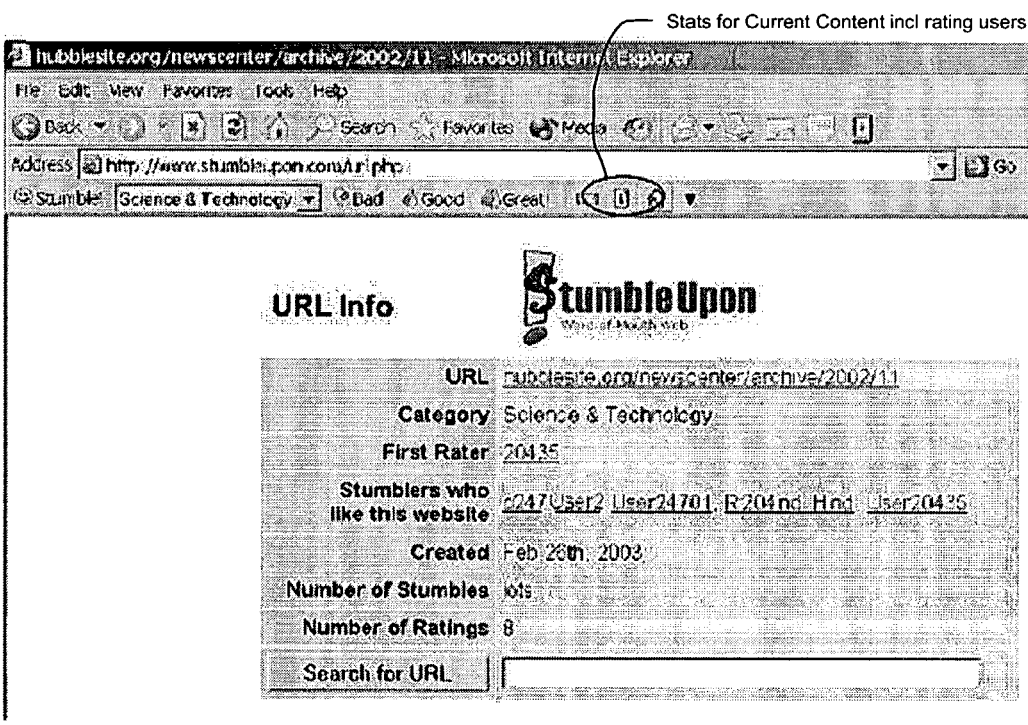
FIG. 18 illustrate a web screen shot of a rating information button which demonstrates how others have rated the recommended content, if any.

Having reference to FIGS. 16, when a user wants to express feelings regarding the quality of content, which has been recommended by the server system or which the user has discovered independently, the user uses a client system to submit the rating along with a client identifier and URL of the rated content to the server system. The client system contains an indication of an action that a user is to perform to rate the quality or directly recommend Internet content currently displayed in the web browser. In a preferred embodiment, the single-action is clicking a mouse button. There may be multiple indications of actions to distinguish the quality rating. In a preferred embodiment, the indications are buttons labeled "good," "bad" and "great". The server stores the recommendation in the Recommended Content Data Database. The server also stores the rating in the Rating Database. See FIG. 7, and further description, below. Further, as shown in FIG. 18, a user may select a rating information button to display how others have rated any recommended content.

The present invention, thus, has a dual-recommendation nature whereby users recommend content to the server system, and the server system, through personalization calculations, recommends that same content back to those other users predicted to find it of particular interest. This dual recommendation nature of the present invention allows it to deal with many problems that the recommendation of Internet content presents. Many systems smaller in breadth, such as the investment recommendation and match making services mentioned above, do not have the first of these steps (i.e. recommendation from users to the system). This step is of vital importance in that it accomplishes the collection of high quality Internet content. Instead, such systems have either data feeds, or often onerous, extensive user questionnaires. The second step of this dual-recommendation process (i.e. personalized recommendation of content to users from the server system) is more similar to the calculations that these systems perform, although the types of data available from users for personalization may be different.

From the perspective of a user, the present invention is most valuable for the recommendation of content that the user would never have thought to search for. The single-action nature of the rating interface encourages frequent user feedback as to quality of recommendations (i.e. ratings). This facilitates improved quality of recommendations over time. In essence, the present invention automates what has become known as "surfing the web," and in a way that yields consistently better results.

FIG. 1a is a block diagram illustrating single-action server-recommendation in one embodiment of the present invention. Section 101a illustrates a browser, which is the Internet content display application. Section 102a is an illustration of the single-action button with which the user can obtain content recommended by the server system. Section 103a is an illustration of the browser after the single-action: it now displays content recommended by the server system.

FIG. 1b is a block diagram illustrating single-action user-recommendation in one embodiment of the present invention. Section 101b illustrates a browser, which contains the to-be-recommended Internet content. Section 102b is an illustration of the single-action button with which the user can recommend content to the server system. Section 103b is an illustration of the browser after the single-action; it now displays an indication of success.

Figure 2:
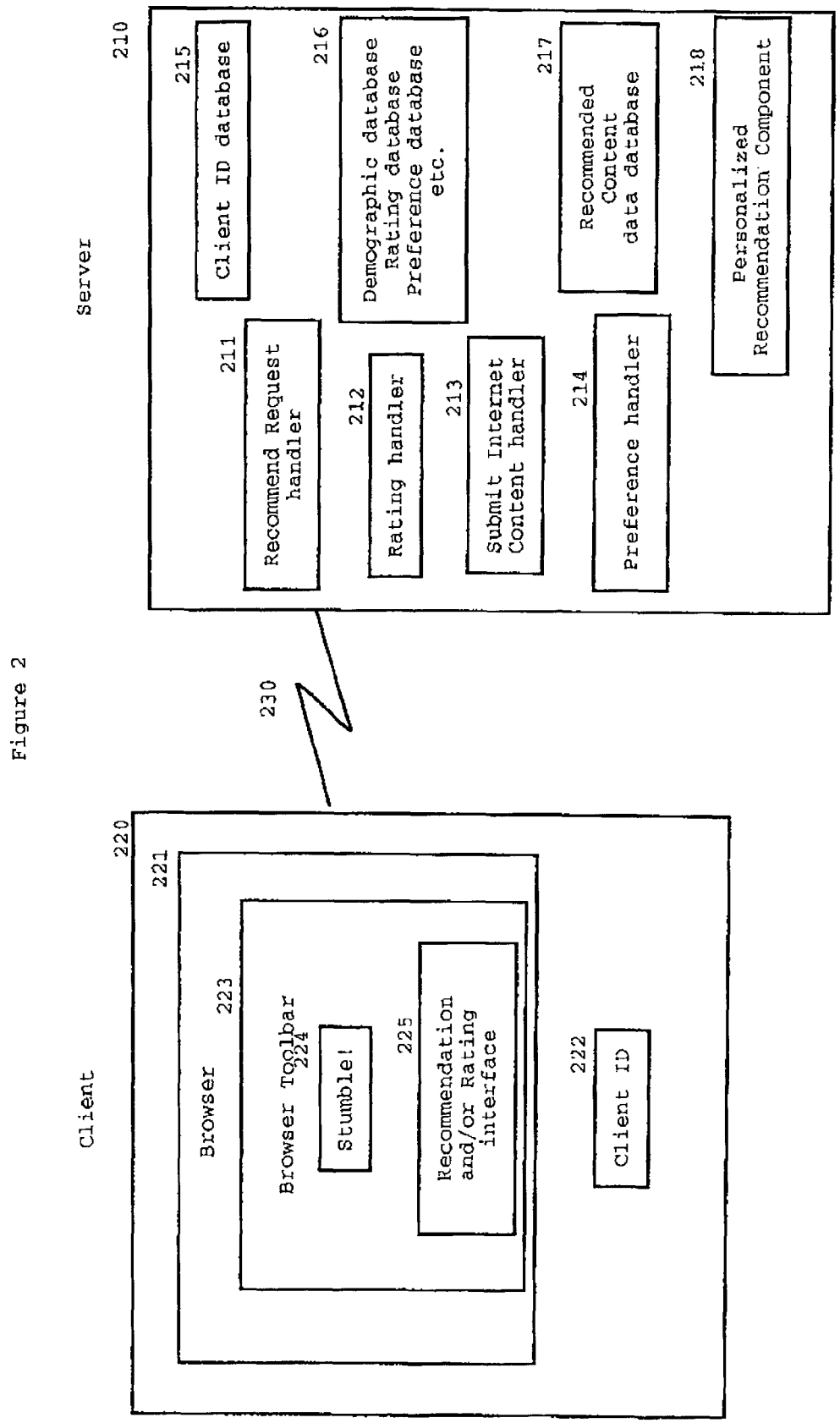
FIG. 2 is a block diagram illustrating an embodiment of the present invention.

FIG. 2 is a block diagram illustrating an embodiment of the present invention. This embodiment supports the single-action recommendation of content over the Internet using the World Wide Web. The server system 210 includes four handlers, 211-214, which interface with the client. A handler is a software component responsible for communications between the server and client systems. The Recommend Request handler 211 receives requests from the client for recommendations, and is further explained in FIG. 4. The rating handler 212 receives ratings from the client, and stores them in the Rating Database. This rating data is used by the Personalized Recommendation Component. The Submit Recommended Content handler 213 receives, from the client, URLs referring to Internet content that the user wishes to have recommended to other users. It triggers the addition of data to the Recommended Content data database 217. The Preference handler 214 enables users to specify their preferences, demographic data and other pertinent information. It is further explained in FIG. 6. The server has four or more databases 215-217. The Client ID database 215 is responsible for maintaining client identifier and authentication information. The database grouping 216 has many databases of client-specific data. These data may consist of user-specified preference, demographics, content rating history, as well as other types of data. The Recommended Content Data database 217 stores data about Recommended Content (not the Recommended Content itself). These databases are used by the Personalized Recommendation Component. The Personalized Recommendation Component 218 performs personalized recommendation calculations given data in the above databases, to determine recommendations of content for particular users. The Personalized Recommendation Component 218 is further explained in FIG. 5.

The client system 220 contains a browser 221 and its assigned client identifier 222. The browser 221 contains an embodiment of the client user interface as a toolbar 223. In one embodiment, the server system assigns and sends the client identifier to the client system when the client system first interacts with the server system. From then on, the client system includes its client identifier in all communication with the server system so that the server system can identify the client. For the shown embodiment, the browser toolbar 223 contains an indication of the single-action to be performed: 224, a button labeled "Stumble!" The shown embodiment also contains an indication of a single-action rating and recommendation interface 225, whereby the client can send ratings and recommendations to the server system pertaining to the currently displayed Internet content. In another embodiment, the buttons may be part of an HTML document in a frame. Those skilled in the art will be aware that the indication of the single-action to be preformed could be generated in many different ways. The server and client systems interact by exchanging information via communications link 230, which may include transmission over the Internet.

Figure 3A:
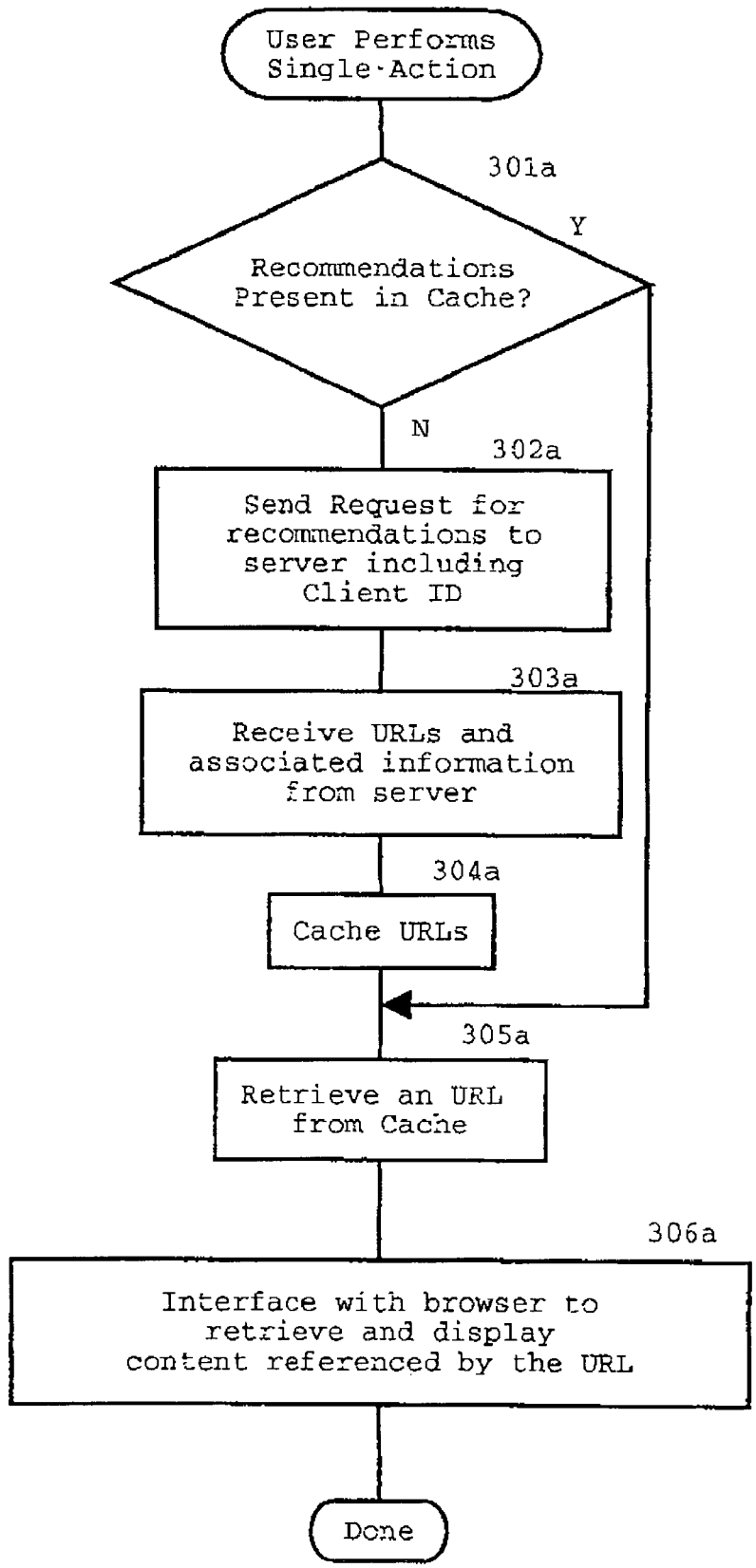
FIG. 3a is a flow diagram of one potential routine that enables single-action recommendation and display of content recommended by the server system.

FIG. 3a is a flow diagram of one embodiment of a routine that enables single-action recommending of Internet content, along with immediate retrieval and display of this content. The flow diagram is initiated when the user performs the single-action. In step 301a, the client system performs a check for cached recommended URLs. Cached recommendations are simply recommendations previously provided by the server system but not yet displayed to the user. If the there are no (or too few) cached recommendations, the client system continues to step 302a. Otherwise, the client system continues at step 305a. In step 302a, the client system sends a request to the server system for Recommended Content, along with its client identifier. In step 303a, the client system receives a list of one or more recommended URL(s) and associated information from the server. This associated information may consist of a predicted rating, categorization data, or other useful information about the Recommended Content. In step 304a, this list is stored in the client's cache of recommended URLs. In step 305a, the client retrieves one URL from the cache. In step 306a, the client interfaces with a browser, and instructs that application to retrieve and display the content referenced by the chosen URL.

Figure 3B:
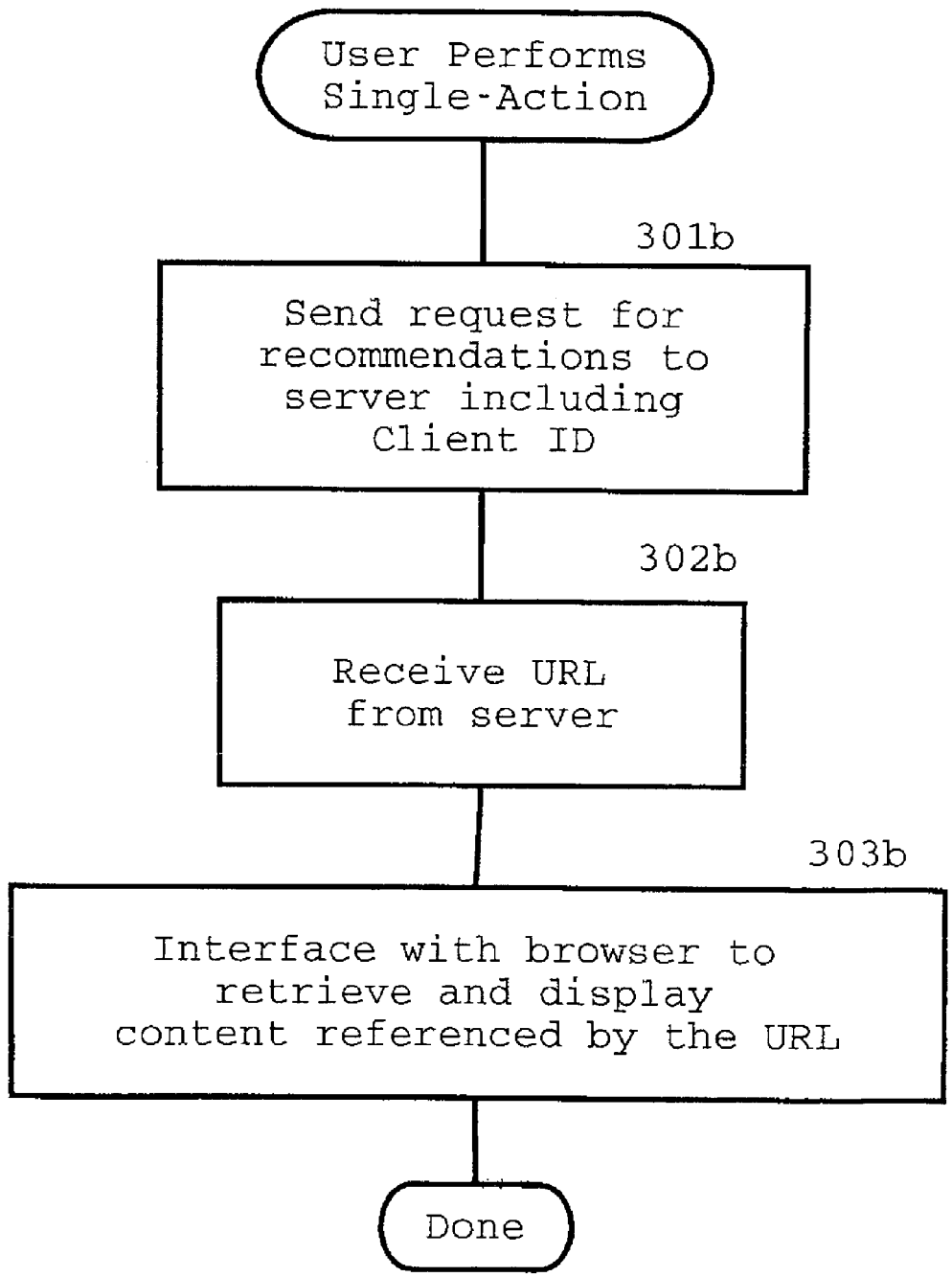
FIG. 3b is a flow diagram of another potential routine that enables single-action recommendation and display of content recommended by the server system.

FIG. 3b is a flow diagram of one embodiment of a routine that enables single-action recommending of Internet content, along with immediate retrieval and display of this content. The flow diagram is initiated when the user performs the single-action. In step 301b, the client system sends a request to the server system for content recommended by the server system, along with its client identifier. In step 302b, the client system receives a recommended URL from the server. In step 303b, the client interfaces with a browser, and instructs that application to retrieve and display the content recommended by the server system, referenced by the URL returned by the server system. In a preferred embodiment, steps 302b and 303b would be accomplished together using an HTTP redirect as the server response, requiring no action from the client in order to make the browser behave properly.

Figure 4:
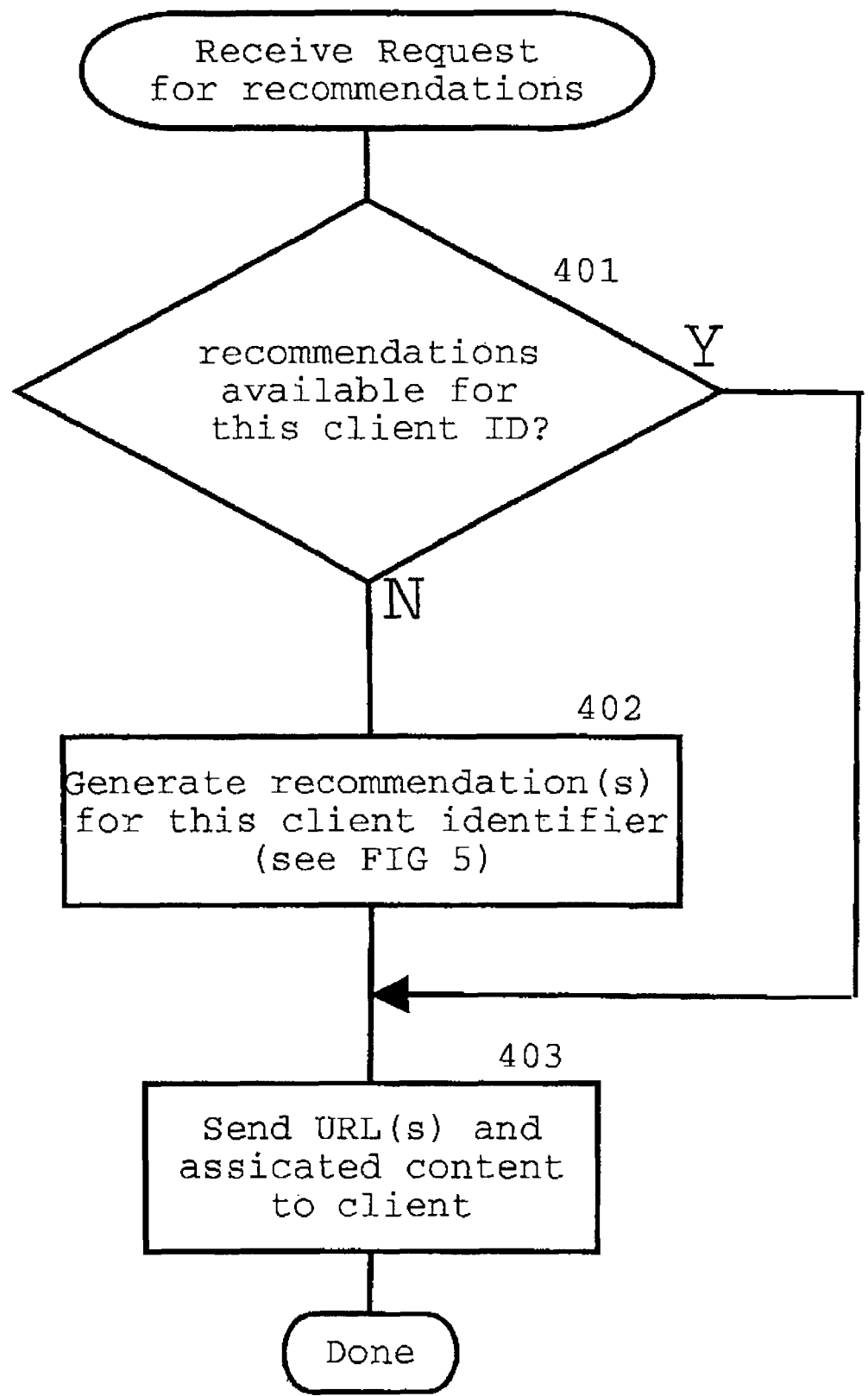
FIG. 4 is a flow diagram of one potential routine that enables the server system to respond to requests for content recommended by the server system.

FIG. 4 is a flow diagram of one embodiment of a routine that enables the server system to respond to requests for Recommended Content. It further explains the Recommend Request hander described in 211. The flow diagram is initiated when the server system receives a request for recommendation from a client. In step 401, the server system checks for existing recommendations for the user represented by the client identifier of the request, as described above. If such recommendations are found, then the server system continues at step 403. Otherwise, the server system proceeds to step 402. In step 402, the server system generates recommendations for the user. This step is further explained in FIG. 5. In step 403, the server returns the URL(s) referring to the Recommended Content, along with associated information, to the client system. Associated information, if present, may consist of a predicted rating, categorization data, or other useful information about the Recommended Content. In the case that the client is embodied as in FIG. 3b, the server system will return only a single URL, possibly embedded in an HTML document containing an HTTP redirect to the chosen URL.

Figure 5:
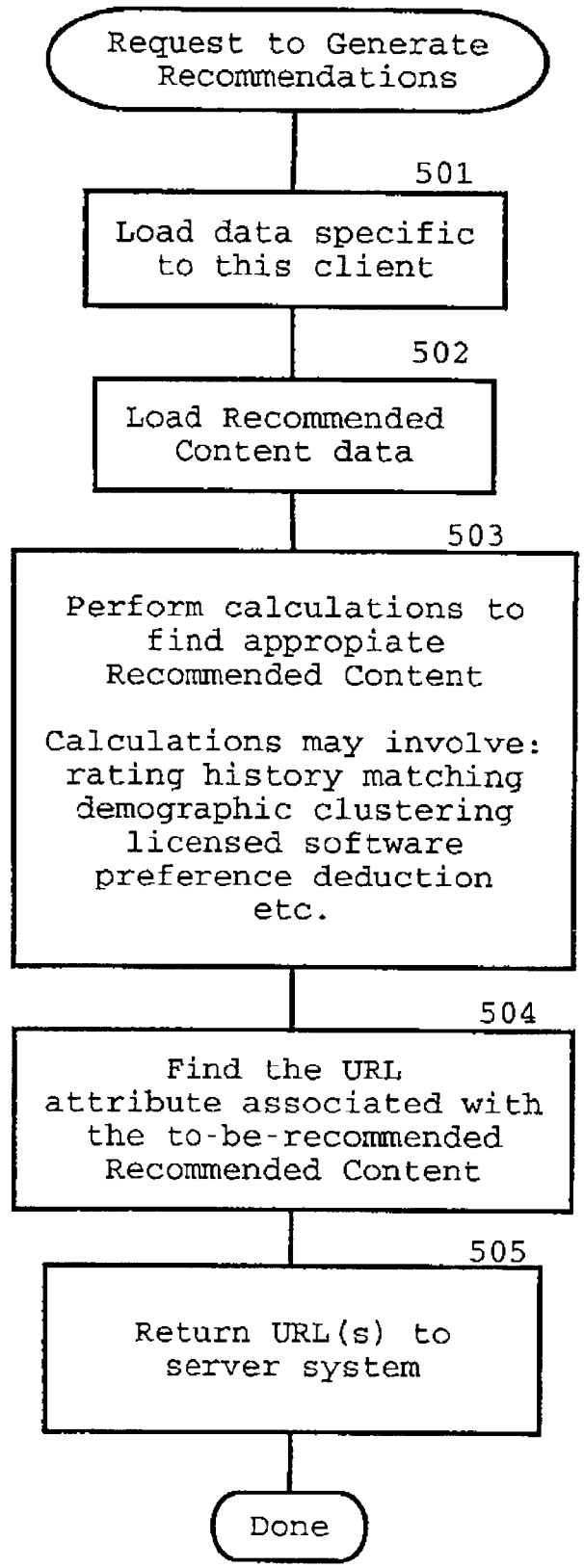
FIG. 5 is a flow diagram of one potential routine that enables the server system to generate recommendations.

FIG. 5 is a flow diagram of the Personalized Recommendation Component. It depicts a routine that determines the Recommended Content to recommend to a given user. The flow diagram is initiated when the Personalized Recommendation Component receives a command to generate recommendations. In step 501, the Personalized Recommendation Component loads user-specific data such as user preferences, demographic data and content rating history. In step 502, the Personalized Recommendation Component loads content-specific data such as subject matter, content quality, complexity of language and general aesthetics. In step 503, these data are used by a calculation engine. Such calculations may involve algorithms found in literature on the subject as well as licensed third party software. An example of such literature is 'An Algorithmic Framework for Performing Collaborative Filtering' by Herlocker, Konstan, Borchers, Riedl. An example of such third party software is Macromedia Likeminds. The result of these calculations is the selection of Recommended Content deemed to be of specific interest to the client, and therefore suitable for recommendation. In step 504, the URL attribute of the selected Recommended Content is retrieved from the Recommended Content Data database. Finally, in step 505, the URL is returned to the server system for further processing, see FIG. 4. If more recommendations are required, the process may be repeated.

Figure 6:
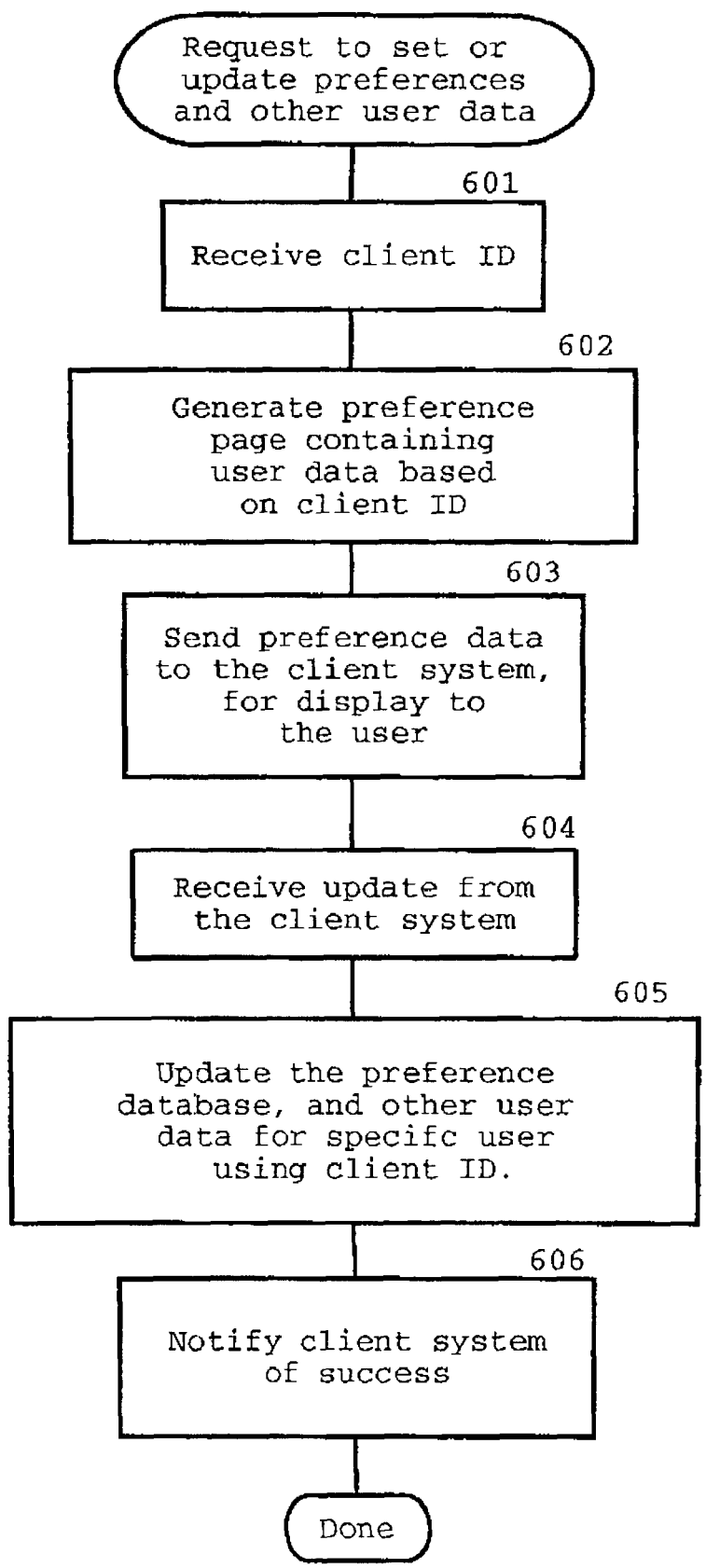
FIG. 6 is a flow diagram of one potential routine that enables the collection of user preferences.

FIG. 6 is a flow diagram of one potential routine that enables the collection of user preferences. It further details the Preference handler 214 previously mentioned. The flow diagram is initiated when the server system receives a request to set or update user-specific preferences or other user-specific data. In step 601, the system receives the client identifier from the client system. In step 602, user-specific data is loaded from the databases based on the client ID, and formatted into a document suitable for transmission to the client. If this is a new client identifier, a blank template is generated. In step 603, this document is sent to the client system. In step 604, updated user-specific data is received from the client system. In step 605, this update is saved to the appropriate databases, including the preference database, the demographic database and so forth, based on the client identifier. In step 606, the server notifies the client of the success of the update.

Figure 7:
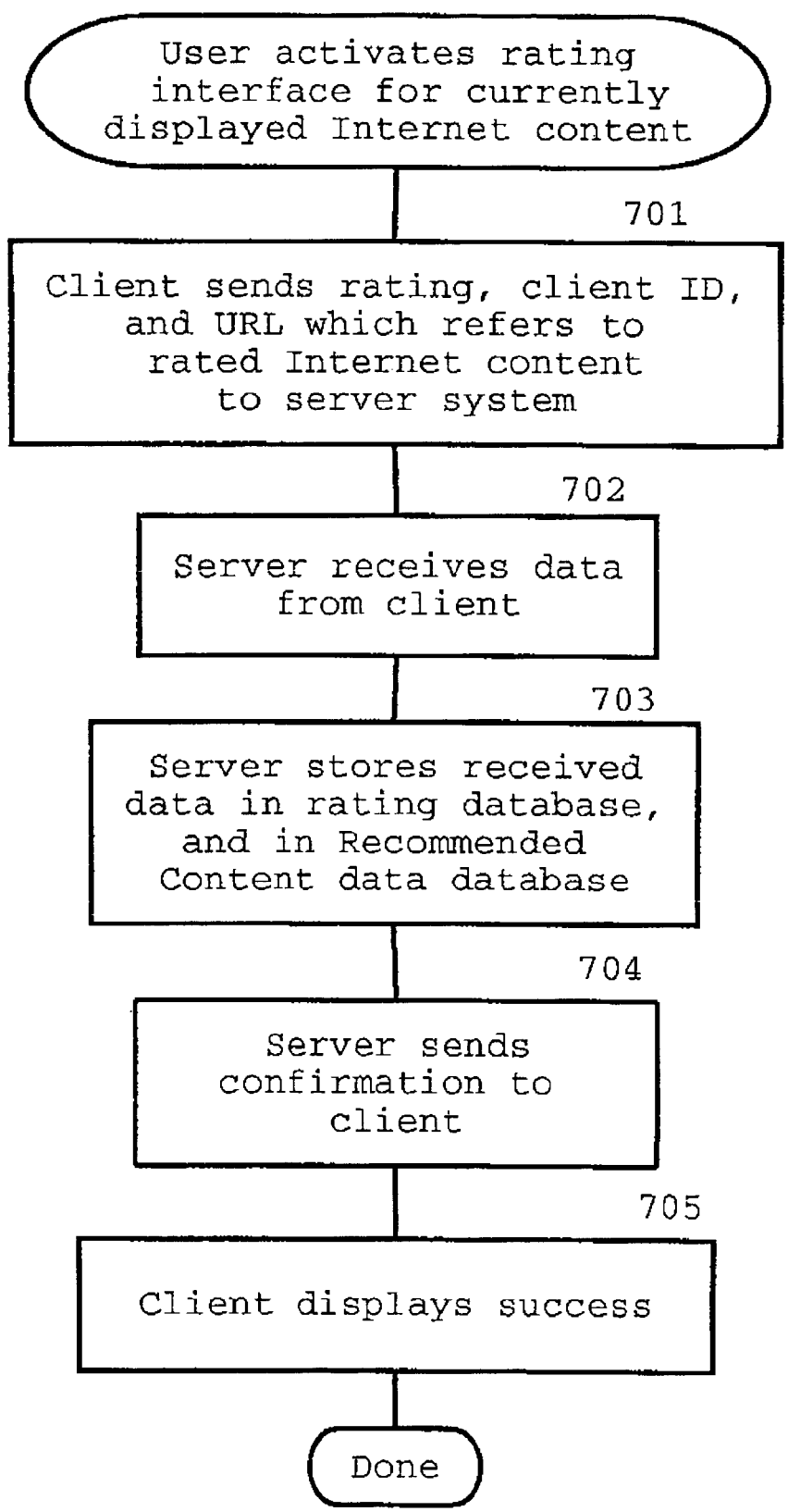
FIG. 7 is a flow diagram of one potential routine that enables rating submission.

FIG. 7 is a flow diagram of one potential routine that enables submission of content ratings, and the recommendation of Internet content. The flow diagram is initiated when the user activates the rating interface for the currently displayed Internet content, perhaps by a single-action pushing of a button. In step 701, the client sends the rating, client identifier, and URL referring to the rated Internet content to the server. In step 702, the server receives the data from the client. In step 703, the server stores the received data in the Rating database, and in the Recommended Content data database, if the rating was of sufficient magnitude. In step 704, the server sends a confirmation message back to the client indicating success. In step 705, the client displays success to the user. Those skilled in the art will recognize that other routines and user interfaces for submission of recommended content are possible.

Figure 8:
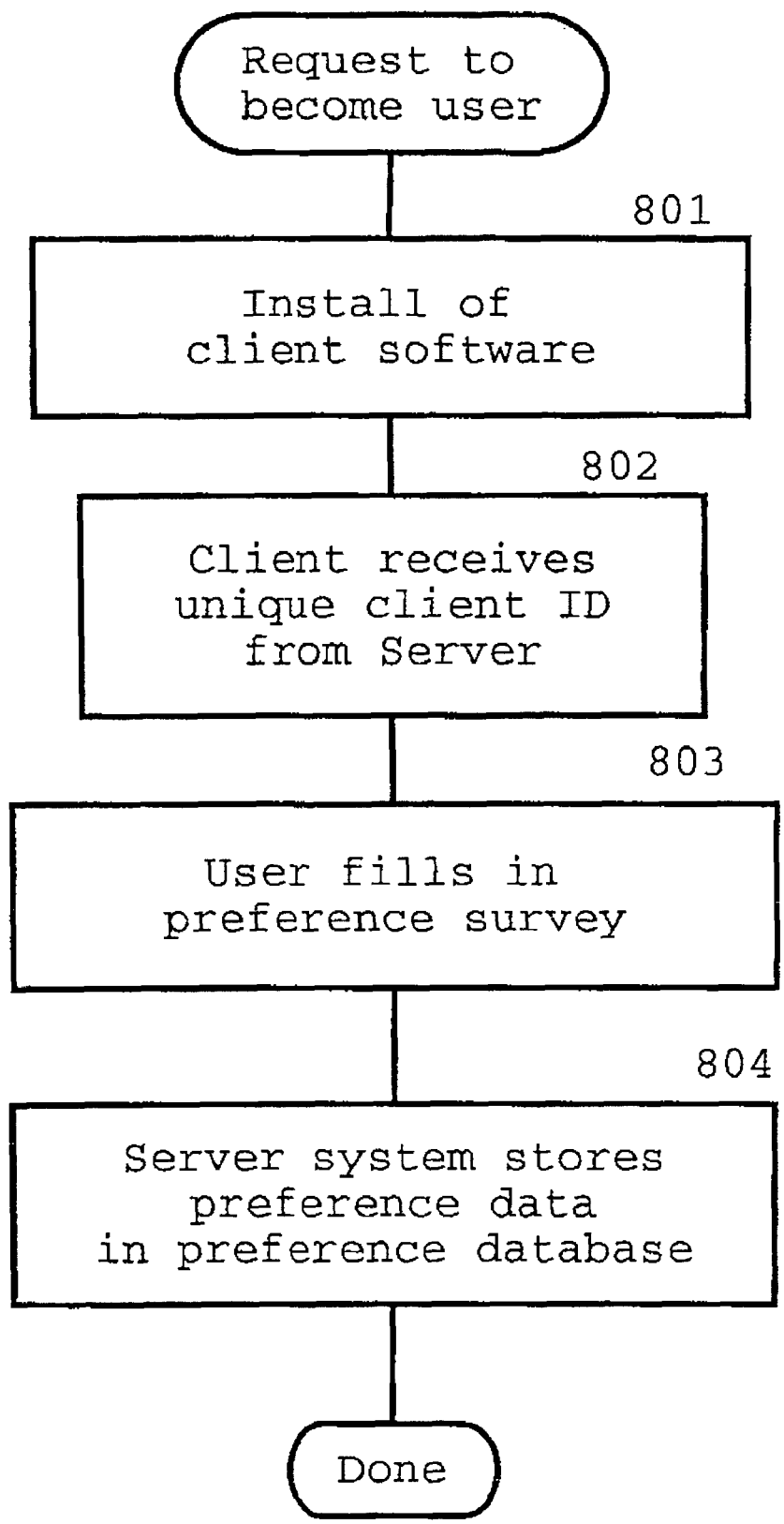
FIG. 8 is a flow diagram of one potential routine that creates a client system.

FIG. 8 is a flow diagram of one potential routine that creates a client system. The flow diagram is initiated when a potential user requests to become a user. In step 801, the user downloads and installs the client software. The nature of this download, and the associated software, will vary depending on the client system requested (see FIGS. 3a and 3b). In step 802, the client obtains a unique client identifier from the server system. In step 803, the user fills out completes a form to indicate a selection of broad interests. In step 804, the server system stores the preference data in the Preference database associating it with the unique client identifier generated in step 802.

EXAMPLE

As shown in FIGS. 19a-19f, one embodiment of the invention is illustrated for interacting with a network user. A network user configures their browser for incorporation a custom interface and then becomes a user known to the system. The figures illustrate the configuration of a new network user's browser, selection of the user's categories of preferred content, operation and options thereof.

Although the present invention has been described in terms of various embodiments, it is not intended that the invention be limited to these embodiments. Modification within the spirit of the invention will be apparent to those skilled in the art. For instance, various different single actions can be used to effect the placement of a request. For example, a voice command may be spoken by the user, a key may be depressed by the user, a button on a television remote control device may be depressed by the user, or selection using any pointing device may be effected by the user. Although a single action may be preceded by multiple physical movements of the user (e.g., moving a mouse so that a mouse pointer is over a button), the single action generally refers to a single event received by a client system that indicates a desire to receive content recommended by the server system, or to rate or recommend Internet content.

Figures 19A, 19B:
FIGS. 19a-19f are screen shots of the help system for the embodiment of FIG. 9, for describing the action initiators or buttons and options.

As shown in FIGS. 19a-19f, additional actions and options are available. FIG. 19a illustrates an access icon which may be loaded onto a computer desktop for access to the Stumbleupon website. Further options illustrated in FIGS. 19a and 19b include a drop-down menu or interest selector which allows the user to choose categories of interest and a series of rating buttons which allow the user to rate the content of the sites which are recommended. Further, the user can select a profile button to be directed to the profile page of the person who has recommended the page. Buttons are also provided to permit e-mailing of the URL of the current recommended page to others and for accessing the information page of the website being viewed.

FIGS. 19c - 19f illustrate a drop down menu containing options for use which include My Info, Top Stumblers, Update Interests, Get Suggested Interests, Toolbar Preferences, Change Current User, Change Password, Stumble History, My Great Sites, Clear History, Send Feedback, Public Forum, Recommend to a Friend, Download Ad Blocking, Report Misclassified Website, Report, Illegal Content, Help, About and StumbleUpon Home Page.

Many of the options provided in the Stumble Menu are self-explanatory or are familiar options for those skilled in the art and use of computers. Many are specific to embodiments of the invention as disclosed herein.

Figure 19D:
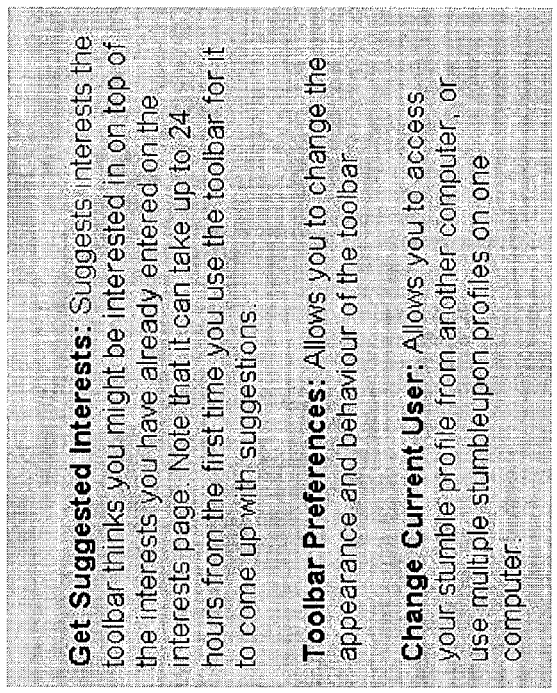
Figure 19C:
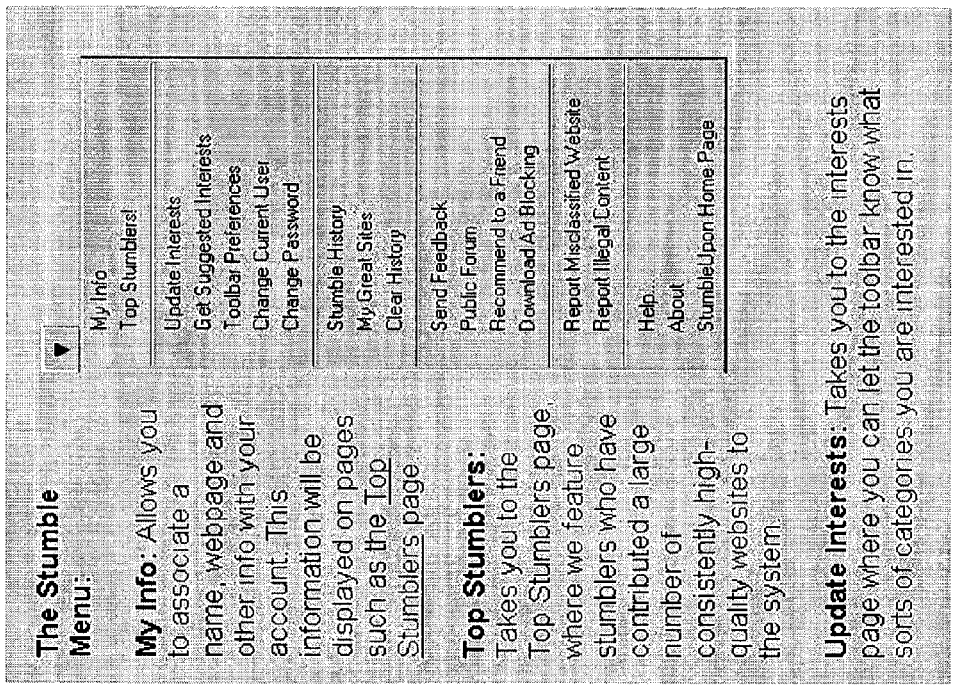

Best seen in FIGS. 19c and 19d, "My Info" permits association of a name, webpage and other information with the users account and is displayed at the top of the viewed pages, such as the Top Stumblers page. "Top Stumblers" directs the user to the Top Stumblers page which features users, known as "Stumblers" who have contributed a large number of consistently high quality websites to the system. "Update Interests" directs the user to the interests page where a selection of categories of interest can be made from the toolbar. "Get Suggested Interests" provides interests that the toolbar thinks the user may be interested in over and above those interests that have been specifically selected by the user. Typically, suggested interests are not provided until such time as the system has developed experience with a particular user. For example, it may be 24 hours from the first use of the toolbar to select interests specific to the user before recommendations of other interests appear. "Toolbar Preferences" permits the user to change the appearance and behaviour of the toolbar. "Change Current User" allows access to a users profile from another computer or to use multiple profiles on a single computer.

Figure 19F:
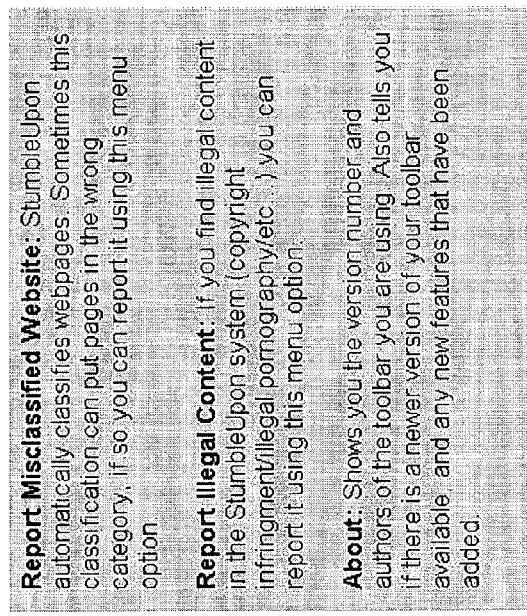
Figure 19E:

Best seen in FIGS. 19e and 19f, "Stumble History" displays a sortable list of webpages the user has stumbled upon, including the category and date of access. Clicking on the displayed column titles results in sorting of the websites by the title. "My Great Sites" displays a sortable list of webpages which have been rated as "great" by the user, The category and rating date are also displayed and clicking on the title of the column results in sorting of the websites by the title. "Clear History" clears "Great History". "Stumble History" and "Rating History" and may be desirable for privacy if other users have access to primary users computer or if the histories are very large. Clearing the histories has no affect of the personalization of the toolbar. "Send Feedback" permits the user to send question, comments, suggestions and complaints to the system administrators. "Public Forum" provides a mailing list for users to discuss the toolbar and to announce to the users when new features have been added to the toolbar. "Recommend to a Friend" permits the user to quickly send the installation page to others. "Download Ad Blocking" installs a third-party program to block banner ads and pop-up ads to reduce interference when using the system. "Report Misclassified Website" permits reporting websites which have been classified in the wrong category. "Report Illegal Content" permits the user to report illegal content such as copyright infringement or pornography and the like. "About" displays the version number and the authors of the toolbar in use and further displays newer version available for use and new features that have been added.

The embodiments of the invention for which an exclusive property or privilege is claimed are defined as follows:

1. A method to present content retrievable using a distributed network having a plurality of users, the method comprising:
   presenting a toolbar at a client computer to a user of the plurality of users, the toolbar including a toolbar button selectable to retrieve, from one of a local cache or a network, a recommendation for content from a uniform resource locator (URL) of a plurality of previously stored URLs, each URL corresponding to a previous recommendation for content at that URL;
   transmitting, in response to a first single-action input through selection of the toolbar button, a first request to retrieve a first recommendation for content, the first recommendation triggered by the first single-action input;
   receiving a content from a first URL from the plurality of previously stored URLs, the first URL corresponding to the first recommendation for content;
   presenting the content from the first URL at the client computer;
   transmitting, after presenting the content from the first URL and in response to a second single-action input through selection of the toolbar button, a second request to retrieve a second recommendation for content, the second recommendation triggered by the second single-action input;
   receiving a content from a second URL corresponding to the second recommendation of content, the second URL retrieved from the plurality of previously stored URLs, wherein the second recommendation for the content from the second URL is based on preferences of the user rather than the content from the first URL; and
   presenting the content from the second URL at the client computer.

2. The method of claim 1, further comprising:
   presenting a rating initiator using the toolbar;
   receiving a third single-action input using the rating initiator, the third single-action input indicative of a preference of the user with respect to a content for display to the user from a third URL; and
   transmitting, in response to the third single-action input, user information including an identifier of the user, the third URL, and a rating value indicative of the preference.

3. The method of claim 2, wherein the user information includes demographic information of the user and wherein the first recommendation is determined based on the demographic information.

4. The method of claim 1 wherein, the first recommendation is retrieved from a server computer storing a plurality of recommendations.

5. The method of claim 1, wherein the first recommendation is determined based on a rating value indicative of a preference of one of the plurality of users with respect to the content from the first URL.

6. The method of claim 1, wherein the first recommendation is determined based on indexing information of the content from the first URL, the indexing information stored at the server computer.

7. The method of claim 1, wherein the first recommendation is determined based on user information including an identifier of the user, a third URL retrievable using the distributed network, and a rating value indicative of a preference of the user with respect to a content from the third URL.

8. The method of claim 7, wherein the first recommendation is determined based on the user information stored at the client computer.

9. The method of claim 7, wherein the first recommendation is determined based on the user information stored at the server computer.

10. The method of claim 1, wherein presenting the content from the first URL comprises providing for display, the content from the first URL.

11. The method of claim 10, wherein presenting the content from the second URL comprises providing for display, the content from the second URL.

12. A system to present content retrievable using a distributed network having a plurality of users, the system comprising:
   a computer processor; and
   a non-transitory computer-readable storage medium storing computer program modules configured to execute on the computer processor, the computer program modules including instructions to:
      present a toolbar to a user of the plurality of users, the toolbar including a toolbar button selectable to retrieve, from one of a local cache or a network, a recommendation for content from a uniform resource locator (URL) of a plurality of previously stored URLs, each URL corresponding to a previous recommendation for content at that URL;
      transmit, in response to a first single-action input through selection of the toolbar button, a first request to retrieve a first recommendation for content, the first recommendation triggered by the first single-action input;
      receive a content from a first URL from the plurality of previously stored URLs, the first URL corresponding to the first recommendation for content;
      present the content from the first URL;
      transmit, after presenting the content from the first URL and in response to a second single-action input through selection of the toolbar button, a second request to retrieve a second recommendation for content, the second recommendation triggered by the second single-action input;
      receive a content from a second URL corresponding to the second recommendation of content, the second URL retrieved from the plurality of previously stored URLs, wherein the second recommendation for the content from the second URL is based on preferences of the user rather than the content from the first URL; and
      present the content from the second URL.

13. The system of claim 12, wherein the computer program modules further include instructions to:
   present a rating initiator using the toolbar;
   receive a single-action input using the rating initiator, the single-action input indicative of a preference of the user with respect to content for display to the user from a URL; and transmit, in response to the single-action input, user information including an identifier of the user, the URL, and a rating value indicative of the preference, wherein the first recommendation is determined based on the rating value.

14. The system of claim 13, wherein the user information includes demographic information of the user and wherein the first recommendation is determined based on the demographic information.

15. The system of claim 12, wherein the first recommendation is determined based on a rating value indicative of a preference of one of the plurality of users with respect to content from the first URL.

16. The system of claim 12, wherein the first recommendation is determined based on indexing information of content from the first URL, the indexing information stored at the server computer.

17. The method of claim 1, wherein the recommendation for content from a URL is across any website, for any http accessible content.

18. The method of claim 1, wherein the content from the second URL is unrelated to the content from the first URL.

19. The method of claim 1, wherein the content from the second URL is random with respect to the content from the first URL.

20. The system of claim 12, wherein the content from the second URL is unrelated to the content from the first URL.

21. A computer program product having a non-transitory computer-readable storage medium storing computer-executable code for presenting content retrievable using a distributed network having a plurality of users, the computer-executable code comprising instructions to:
present a toolbar to a user of the plurality of users, the toolbar including a toolbar button selectable to retrieve, from one of a local cache or a network, a recommendation for content from a uniform resource locator (URL) of a plurality of previously stored URLs, each URL corresponding to a previous recommendation for content at that URL;
transmit, in response to a first single-action input through selection of the toolbar button, a first request to retrieve a first recommendation for content, the first recommendation triggered by the first single-action input;
receive a content from a first URL from the plurality of previously stored URLs, the first URL corresponding to the first recommendation for content;
present the content from the first URL;
transmit, after presenting the content from the first URL and in response to a second single-action input through selection of the toolbar button, a second request to retrieve a second recommendation for content, the second recommendation triggered by the second single-action input;
receive a content from a second URL corresponding to the second recommendation of content, the second URL retrieved from the plurality of previously stored URLs, wherein the second recommendation for the content from the second URL is based on preferences of the user rather than the content from the first URL; and
present the content from the second URL.

22. The computer program product of claim 21, wherein the computer-executable code further comprises instructions to:
present a rating initiator using the toolbar;
receive a single-action input using the rating initiator, the single-action input indicative of a preference of the user with respect to content for display to the user from a URL; and
transmit, in response to the single-action input, user information including an identifier of the user, the URL, and a rating value indicative of the preference, wherein the first recommendation is determined based on the rating value.

23. The computer program product of claim 21, wherein the first recommendation is determined based on a rating value indicative of a preference of one of the plurality of users with respect to content from the first URL.

24. The computer program product of claim 21, wherein the content from the second URL is unrelated to the content from the first URL.

* * * * *